United States Patent [19]

Andoh et al.

[11] 4,364,988

[45] Dec. 21, 1982

[54] MAGNETIC RECORDING MEDIUM

[75] Inventors: Haruo Andoh, Suita; Susumu Kitaoka, Kyoto; Toshinobu Sueyoshi, Kyoto; Hikaru Ishida, Kyoto; Akira Kato, Takarazuka, all of Japan

[73] Assignee: Hitachi Maxell, Ltd., Osaka, Japan

[21] Appl. No.: 61,253

[22] Filed: Jul. 27, 1979

[30] Foreign Application Priority Data

Jul. 31, 1978 [JP] Japan ................................ 53/93891
Jul. 31, 1978 [JP] Japan ................................ 53/93895

[51] Int. Cl.³ .............................................. G11B 5/70
[52] U.S. Cl. ................................ 428/212; 252/62.54; 252/62.56; 428/329; 428/694; 428/900; 360/134
[58] Field of Search ............... 428/900, 212, 329, 694, 428/695; 427/128; 252/62.54, 62.56; 360/134, 135, 136

[56] References Cited

U.S. PATENT DOCUMENTS

| | | | |
|---|---|---|---|
| 2,941,901 | 6/1960 | Prill et al. | 428/212 |
| 3,740,266 | 6/1973 | Akashi et al. | 428/328 |
| 4,010,310 | 3/1977 | Kabota et al. | 428/900 |
| 4,069,367 | 1/1978 | Umeki et al. | 428/900 |
| 4,075,384 | 2/1978 | Suzuki et al. | 428/900 |
| 4,091,158 | 5/1978 | Kasuga et al. | 428/900 |
| 4,112,184 | 9/1978 | Umeki et al. | 428/900 |
| 4,137,342 | 1/1979 | Kanten | 427/127 |
| 4,259,392 | 3/1981 | Suzuki | 428/212 |

FOREIGN PATENT DOCUMENTS 2629931 1/1977 Fed. Rep. of Germany ... 252/62.56
54-8286 2/1979 Japan ................................ 428/900

Primary Examiner—Stanley S. Silverman
Attorney, Agent, or Firm—Birch, Stewart, Kolasch & Birch

[57] ABSTRACT

An improved magnetic recording medium is disclosed, particularly a magnetic tape suitable for sound recording and video recording, which comprises as a recording element a mixture of cobalt-containing iron oxide magnetic particles consisting essentially of ferromagnetic iron oxide particles containing cobalt and optionally a divalent iron in the most outer layer thereof, and γ-ferric oxide particles in the ratio of 10:90 to 50:50 by weight, said mixture of cobalt-containing iron oxide magnetic particles and γ-ferric oxide particles being applied to a substrate (e.g. a polyester film) with a binding agent. The magnetic recording medium has excellent electromagnetic transducing properties and improved charging properties and is useful for conventional magnetic recording apparatus used at normal position with high sensitivity in wide range of frequency.

11 Claims, 1 Drawing Figure

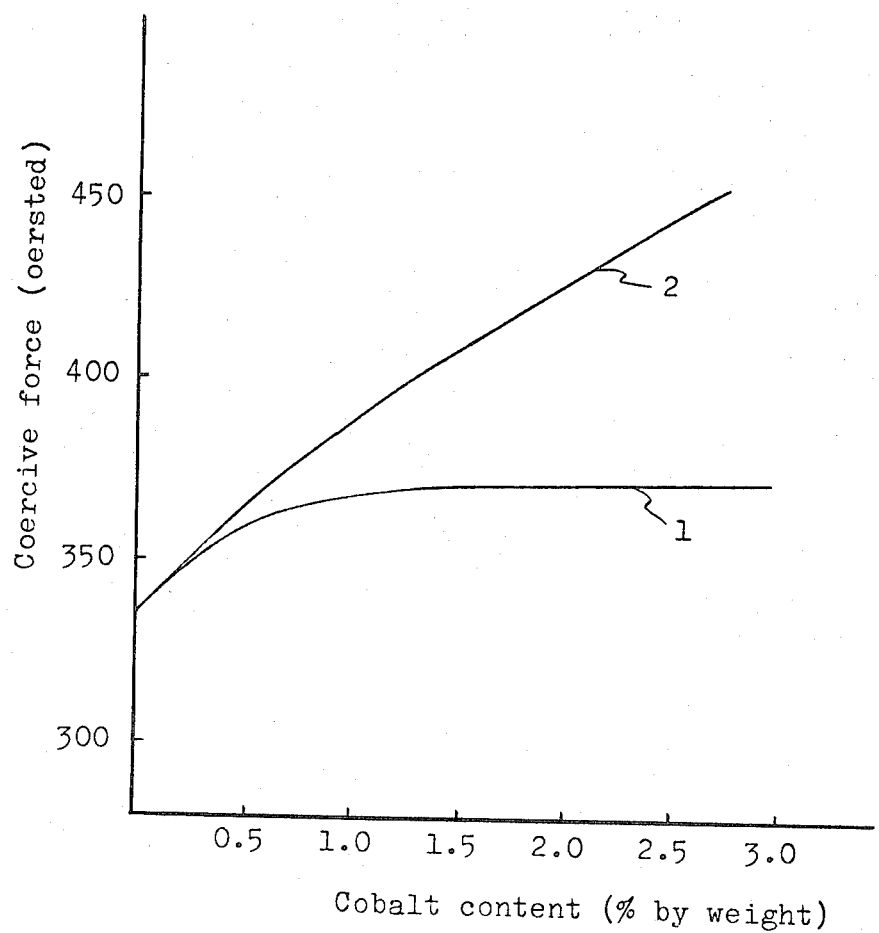

MAGNETIC RECORDING MEDIUM

The present invention relates to an improvement of a magnetic recording medium, particularly a magnetic tape suitable for sound recording and video recording.

There have widely been used magnetic tapes containing γ-ferric oxide (γ-Fe₂O₃) particles as a recording element for sound recording or video recording, because the γ-ferric oxide particles are chemically and magnetically stable and are not expensive. These conventional magnetic tapes have a comparatively low coercive force such as about 300 to 380 oersteds, and hence, show a good output power in the low frequency range but do not show a sufficient output power in the high frequency range.

In order to improve the drawback of the γ-ferric oxide particles, it is proposed to form a layer of iron oxide containing cobalt on the surface of the γ-ferric oxide particles. The magnetic particles thus obtained have a high coercive force because of the cobalt containment, but on the other hand, the magnetic tape prepared from the magnetic particles tends to show an increased surface electrical resistance in comparison with the magnetic tape prepared from γ-ferric oxide particles, and hence, the magnetic tape has drawbacks that it is easily electrostatically charged and is readily deposited with dust which induces drop out, and further, a noise occurs due to discharge. In order to eliminate these drawbacks, a conductive material such as carbon black is added to the magnetic composition, but increase of non-magnetic components unfavorably results in lowering of packed amount of magnetic particles which gives unfavorable effect on the characteristics of the magnetic recording medium.

The present inventors have initiated intensive studies to improve the charging of the magnetic recording tape while keeping the excellent characteristics of the cobalt-containing iron oxide magnetic particles, and have found that a mixture of γ-ferric oxide particles and cobalt-containing iron oxide magnetic particles is excellent as a recording element and can give the desired magnetic tape.

An object of the present invention is to provide a magnetic recording medium having improved charging properties as well as excellent electromagnetic transducing properties. Another object of the invention is to provide a magnetic recording medium useful in wide range of frequency. A further object of the invention is to provide a magnetic tape useful for a conventional magnetic recording apparatus used at normal position with high sensitivity in a wide range of frequency. These and other objects of the invention will be apparent from the following description.

The magnetic recording medium of the present invention comprises as the essential recording element a mixture of γ-ferric oxide particles and cobalt-containing iron oxide magnetic particles consisting of ferromagnetic iron oxide particles containing cobalt in the most outer layer thereof, and the magnetic recording medium has a surface electrical resistance similar to that of the conventional magnetic recording medium comprising γ-ferric oxide particles as the recording element and has excellent magnetic characteristics in the high frequency range similar to that of the known magnetic recording medium comprising the cobalt-containing iron oxide magnetic particles alone as the recording element.

The cobalt-containing iron oxide magnetic particles used in the present invention comprise ferromagnetic iron oxide particles containing cobalt in the most outer layer thereof and are prepared by dispersing γ-ferric oxide particles or ferromagnetic iron oxide particles which are obtained by partially reducing γ-ferric oxide particles into an aqueous solution of a cobalt salt (e.g. cobalt sulfate, cobalt chloride, cobalt nitrate) which contains an alkali (e.g. sodium hydroxide, potassium hydroxide, lithium hydroxide) in an amount of one equivalent or more to the cobalt salt, and maintaining the mixture at a temperature of higher than room temperature up to the boiling point of the mixture, by which cobalt is distributed into the most outer layer of the γ-ferric oxide particles or ferromagnetic iron oxide particles, wherein cobalt is contained in the most outer layer in an amount of 0.2% by weight or more, preferably 0.3 to 5% by weight, based on the weight of the particle. The detail of the preparation of the cobalt-containing iron oxide magnetic particles is disclosed in U.S. Ser. No. 898,127.

The cobalt-containing iron oxide magnetic particles have a particle size in the longitudinal direction of not more than 1μ, preferably 0.1 to 1μ, and an axis ratio (long axis/short axis) of not less than 2, preferably 5 to 15.

The cobalt-containing iron oxide magnetic particles have a higher coercive force than that of γ-ferric oxide particles, and further, since it has a core of ferromagnetic iron oxide, they are stable and can keep their excellent magnetic characteristics for a long period of time, and further, have also good magnetic characteristics in the low frequency range. The cobalt-containing iron oxide magnetic particles have improved magnetic characteristics in the high frequency range, but when the particles have too high of a coercive force than the coercive force of the γ-ferric oxide particles with which they are mixed, the magnetic recording medium obtained therefrom shows inferior erasing properties. On the other hand, when the difference of the coercive force between the cobalt-containing iron oxide magnetic particles and the γ-ferric oxide particles is too small, the desired improvement of the magnetic characteristics in the high frequency range can not be achieved. Accordingly, the difference of the coercive force between the cobalt-containing iron oxide magnetic particles and the γ-ferric oxide particles is preferably in the range of 20 to 100 oersteds, more preferably 30 to 80 oersteds.

It has further been found that it is preferable to incorporate a ferrous salt (e.g. ferrous sulfate, ferrous chloride, ferrous nitrate) into the surface layer of the cobalt-containing iron oxide in addition to a cobalt salt, by which the cobalt-containing iron oxide particles show a greater coercive force and also improved charging properties in comparison with the particles containing only a cobalt salt. That is, when the cobalt-containing iron oxide magnetic particles are prepared by dispersing γ-ferric oxide particles or ferromagnetic iron oxide particles obtained by partial reduction of γ-ferric oxide particles into an aqueous solution containing a ferrous salt as well as a cobalt salt and an alkali as mentioned hereinbefore, and maintaining the mixture at a temperature of higher than room temperature up to the boiling point of the mixture under an atmosphere that the divalent iron is substantially not oxidized to form the most outer layer containing divalent iron and cobalt, the resulting particles show a greater coercive force than the particles containing only cobalt in the most outer layer as is clear from the accompanying drawing.

The drawing shows a relation between the coercive force of the cobalt-containing iron oxide magnetic particles and the cobalt content thereof, wherein a curve 1 shows the case of adding no ferrous salt into the aqueous solution and a curve 2 shows the case of adding a ferrous salt in an amount of three fold by mol of that of the cobalt salt. As is clear from this figure, when a divalent iron is incorporated into the cobalt-containing iron oxide particles, the particles show a largely increased coercive force in comparison with the particles containing only cobalt at the same cobalt level. This means that in order to obtain the particles having a prescribed coercive force, the content of cobalt can be decreased by incorporation of the divalent iron in addition to cobalt, and hence, the particles show an improved electrical conductivity.

The cobalt-containing iron oxide magnetic particles used in the present invention have preferably a coercive force of 370 to 420 oersteds, a cobalt content of about 0.3 to 1.8% by weight and a divalent iron content of 0.1 to 8% by weight, more preferably 0.9 to 5.4% by weight, based upon the weight of the cobalt-containing iron oxide magnetic particle.

The $\gamma$-ferric oxide particles to be mixed with the cobalt-containing iron oxide magnetic particles include all conventional $\gamma$-ferric oxide particles. The particles act to decrease the surface electrical resistance. The $\gamma$-ferric oxide particles have preferably a coercive force of not more than 380 oersteds, and more preferably 320 to 370 oersteds.

The coercive force of the cobalt-containing iron oxide magnetic particles and the $\gamma$-ferric oxide particles is measured as follows:

The particles are packed into a capsule in an amount of about 1 g/cc, and then, the coercive force of the particles is measured at a magnetic field of 10,000 oersteds with a vibrating sample magneto meter (VSM III) (made by Toei Kogyo K.K.).

The cobalt-containing iron oxide magnetic particles and $\gamma$-ferric oxide particles are mixed in a ratio of 10:90 to 50:50 by weight, preferably 25:75 to 50:50 by weight. When the cobalt containing iron oxide magnetic particles are mixed with the $\gamma$-ferric oxide particles in less than 10% by weight based on the total weight of the mixture, the magnetic recording medium does not show the desired coercive force, but on the other hand, when the amount of the cobalt-containing iron oxide particles is over 50% by weight based on the total weight of the mixture, the magnetic recording medium shows an undesirably increased surface electrical resistance. By mixing both particles in the ratio above-mentioned, there can be obtained the desired magnetic recording medium having excellent electromagnetic transducing properties and less charging properties.

The magnetic recording medium can be prepared from the mixture thus obtained in conventional methods. For example, a composition comprising the mixture of the particles as mentioned above is prepared by mixing the mixture with a binding agent, an organic solvent and other additives, and the magnetic composition thus prepared is applied to a substrate such as a polyester film by a conventional means such as a roll coater, a blade coater, an air knife coater, or the like, and thereafter is dried.

The binding agent includes any conventional binding agents such as vinyl chloride-vinyl acetate copolymer, polyvinyl butyral, polyurethane resin, nitrocellulose, polyester resin, or the like.

The organic solvent includes toluene, methyl isobutyl ketone, methyl ethyl ketone, cyclohexanol, tetrahydrofuran, ethyl acetate, or the like, which may be used alone or in combination of two or more thereof.

The magnetic composition may also contain other additives such as dispersing agents (e.g. lecithin), lubricants (e.g. lauric acid, liquid paraffin), plasticizers (e.g. dioctyl phthalate, dibutyl phthalate), or the like.

The magnetic recording medium thus prepared has a coercive force of not more than 380 oersteds, preferably 340 to 380 oersteds, and has excellent electromagnetic transducing properties suitable for a conventional magnetic recording apparatus used at normal position and further has improved charging properties.

The present invention is illustrated by the following Examples but is not limited thereto.

EXAMPLE 1

Acicular $\gamma$-Fe$_2$O$_3$ particles (particle size: about 0.3$\mu$, axis ratio (long axis/short axis): about 10, coercive force: 337 oersteds, maximum magnetization: 74 emu/g, 1 kg) were dispersed in water (6 liters), and thereto were added an aqueous solution (1 liter) of cobalt sulfate (CoSO$_4$.7H$_2$O) (23.85 g) and an aqueous solution (1 liter) of sodium hydroxide (10.79 g). The mixture was reacted with agitation at 100° C. for 5 hours. After the reaction was finished, the resulting precipitates were separated by filtration, washed well with water, and then dehydrated and dried at 130° C. for 2 hours.

The cobalt-containing iron oxide magnetic particles thus obtained had a coercive force of 393 oersteds and a maximum magnetization of 75 emu/g.

The cobalt-containing iron oxide magnetic particles and the same $\gamma$-Fe$_2$O$_3$ particles as used above were mixed in the ratio of 25:75 and 50:50 by weight. By using the resulting magnetic particles mixtures, two magnetic compositions were prepared in accordance with the following formulation.

| Magnetic particles mixture | 75 parts by weight |
| Vinyl chloride-vinyl acetate copolymer | 25 parts by weight |
| Dioctyl phthalate | 5 parts by weight |
| Toluene | 100 parts by weight |
| Methyl ethyl ketone | 100 parts by weight |

The magnetic compositions were applied onto a polyester film (thickness: 12$\mu$) in a thickness of about 6$\mu$ (in dry state). After drying the composition, the film was cut in a fixed width to give two magnetic tapes.

EXAMPLE 2

Acicular $\gamma$-Fe$_2$O$_3$ particles (particle size: about 0.3$\mu$, axis ratio: about 10, coercive force: 337 oersteds, maximum magnetization: 74 emu/g, 1 kg) were dispersed in water (6 liters) and thereto were added an aqueous solution (1 liter) of cobalt sulfate (CoSO$_4$.7H$_2$O) (42.93 g) and ferrous sulfate (FeSO$_4$.7H$_2$O) (127.37 g) and an aqueous solution (1 liter) of sodium hydroxide (146.60 g). The mixture was reacted with agitation at room temperature for 3 hours. After the reaction was finished, the resulting precipitates were separated by filtration, washed well with water, and then dehydrated and dried at 130° C. for 2 hours.

The cobalt-containing iron oxide magnetic particles thus obtained had a coercive force of 395 oersteds and a maximum magnetization of 75 emu/g.

The cobalt-containing iron oxide magnetic particles and the same $\gamma$-$Fe_2O_3$ particles as used above were mixed in the ratio of 30:70 and 50:50 by weight. By using the resulting magnetic particles mixtures, two magnetic compositions were prepared in accordance with the same formulation as used in Example 1, and further two magnetic tapes were prepared in the same manner as described in Example 1.

REFERENCE EXAMPLE 1

A magnetic tape was prepared in the same manner as described in Example 1 except that the same $\gamma$-$Fe_2O_3$ particles as used in Example 1 (75 parts by weight) were used alone instead of the magnetic particles mixture.

REFERENCE EXAMPLE 2

A magnetic tape was prepared in the same manner as described in Example 1 except that the same cobalt-containing iron oxide magnetic particles as prepared in Example 1 (75 parts by weight) were used alone instead of the magnetic particles mixture.

REFERENCE EXAMPLE 3

A magnetic tape was prepared in the same manner as described in Example 2 except that the same cobalt-containing iron oxide magnetic particles as prepared in Example 2 were used alone instead of the magnetic particles mixture.

With respect to the magnetic tapes prepared in the above Examples 1 and 2 and Reference Examples 1 to 3, there were measured various properties such as magnetic characteristics, electromagnetic transducing properties (i.e. sensitivity, frequency characteristics) and surface specific resistance. The results are shown in the following table.

As is clear from the results, the magnetic tapes of the present invention show greater electromagnetic transducing properties and less surface electrical (specific) resistance in comparison with the magnetic tapes of Reference Examples wherein $\gamma$-ferric oxide particles or cobalt-containing iron oxide magnetic particles are used alone.

What is claimed is:

1. A magnetic recording medium which comprises as a recording element a substrate with a single layer of a composition on the surface thereof comprising a mixture of cobalt-containing iron oxide magnetic particles consisting essentially of ferromagnetic iron oxide particles containing cobalt in the most outer layer thereof and $\gamma$-ferric oxide particles, said cobalt-containing iron oxide magnetic particles and $\gamma$-ferric oxide particles being mixed in the ratio of 10:90 to 50:50 by weight, said cobalt-containing iron oxide magnetic particles having a coercive force of 20 to 100 oersteds higher than the coercive force of the $\gamma$-ferric oxide particles.

2. A magnetic recording medium according to claim 1, wherein the cobalt-containing iron oxide magnetic particles have a coercive force of 30 to 80 oersteds higher than the coercive force of the $\gamma$-ferric oxide particles.

3. A magnetic recording medium according to claim 1, wherein the cobalt-containing iron oxide magnetic particles and the $\gamma$-ferric oxide particles are mixed in the ratio of 25:75 to 50:50 by weight.

4. A magnetic recording medium according to claim 1, wherein the $\gamma$-ferric oxide particles have a corecive force of not more than 380 oersteds.

5. A magnetic recording medium according to claim 4, wherein the $\gamma$-ferric oxide particles have a coercive force of 320 to 370 oersteds.

6. A magnetic recording medium according to any one of claims 1 to 5, wherein the surface layer of cobalt-containing iron oxide magnetic particles contains a divalent iron in addition to cobalt.

7. A magnetic recording medium according to claim 6, wherein the cobalt-containing iron oxide magnetic particles have a cobalt content of 0.3 to 1.8% by weight and a divalent iron content of 0.1 to B 8% by weight based on the weight of the cobalt-containing iron oxide magnetic particles and have a coercive force of 370 to 420 oersteds.

8. A magnetic recording medium according to claim 1, which has a coercive force of not more than 380 oersteds.

9. A magnetic recording medium according to claim 8, which has a coercive force of 340 to 380 oersteds.

10. The magnetic recording medium of claim 1,

|  | Example 1 | | Example 2 | | Reference Example 1 | Reference Example 2 | Reference Example 3 |
| --- | --- | --- | --- | --- | --- | --- | --- |
| Ratio by weight of cobalt-containing iron oxide magnetic particles/$\gamma$-$Fe_2O_3$ particles | 25/75 | 50/50 | 30/70 | 50/50 | 0/100 | 100/0 | 100/0 |
| Coercive force (oersted) | 356 | 367 | 357 | 370 | 347 | 401 | 415 |
| Sensitivity (dB) | +2.3 | +2.2 | +2.3 | +2.2 | +2.3 | +1.3 | +1.2 |
| Frequency characteristics (dB) | | | | | | | |
| 7 kHz | +3.7 | +3.9 | +4.3 | +4.0 | +2.9 | +4.4 | +5.1 |
| 12.5 kHz | +6.8 | +7.0 | +7.7 | +7.1 | +5.9 | +8.2 | +9.3 |
| 15 kHz | +7.5 | +7.8 | +9.2 | +8.5 | +6.5 | +10.0 | +11.3 |
| Surface specific resistance ($\Omega/cm^2$) | $1.14 \times 10^9$ | $3.14 \times 10^9$ | $6.60 \times 10^8$ | $2.13 \times 10^9$ | $3.09 \times 10^8$ | $7.22 \times 10^{10}$ | $2.58 \times 10^{10}$ |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

wherein a ferrous salt is incorporated into the surface layer of the cobalt-containing iron oxide magnetic particles.

11. The magnetic recording medium of claim 10, wherein the ferrous salt is selected from the group consisting of ferrous sulfate, ferrous chloride and ferrous nitrate.

* * * * *